United States Patent
Chang (10) Patent No.: US 6,470,757 B2
(45) Date of Patent: Oct. 29, 2002

(54) ULTRASONIC FLOW VELOCITY MEASURING METHOD

(75) Inventor: Hak Soo Chang, 10-1301 Jangmi-mayeul Yatop-dong, Pungdang-ku, Sungnam, Kyunggi-do (KR)

(73) Assignees: Hak Soo Chang, Sungnam (KR); Chang Min Tech Co., Ltd., Sungnam (KR)

( * ) Notice: Subject to any disclaimer, the term of this patent is extended or adjusted under 35 U.S.C. 154(b) by 0 days.

(21) Appl. No.: 09/793,730

(22) Filed: Feb. 27, 2001

(65) Prior Publication Data

US 2001/0037676 A1 Nov. 8, 2001

Related U.S. Application Data

(60) Continuation-in-part of application No. 09/557,291, filed on Apr. 25, 2000, now abandoned, which is a division of application No. 09/207,145, filed on Dec. 8, 1998, now abandoned.

(30) Foreign Application Priority Data

Sep. 3, 1998 (KR) .............................................. 98-36337

(51) Int. Cl.$^7$ ................................................. G01F 1/66
(52) U.S. Cl. .................................. 73/861.27; 73/861.29
(58) Field of Search ......................... 73/861.27, 861.28, 73/861.29

(56) References Cited

U.S. PATENT DOCUMENTS

| 4,143,548 A | * | 3/1979 | Graeve et al. ................. 73/181 |
| 4,545,244 A | * | 10/1985 | Yasuda et al. ........... 73/861.28 |
| 5,531,124 A | * | 7/1996 | Kim et al. ................ 73/861.27 |

FOREIGN PATENT DOCUMENTS

| DE | 19722140 | 12/1997 |
| JP | 2676321 | 7/1997 |
| JP | 10-104039 | 4/1998 |

* cited by examiner

Primary Examiner—Harshad Patel
(74) Attorney, Agent, or Firm—Lee & Sterba, P.C.

(57) ABSTRACT

An ultrasonic flow velocity measuring method using a transit time difference of continuous sine waves without transmitting/receiving an ultrasonic pulse comprises steps of amplitude-modulating a continuous ultrasonic sine wave carrier into a lower frequency and transiting the amplitude-modulated signal, whenever the ultrasonic transit time is measured; demodulating the amplitude-modulated signal; detecting or discriminating the amplitude-modulated signal from the demodulated signal and measuring a time interval from the moment that the ultrasonic sine wave is amplitude-modulated till the amplitude-modulated signal is demodulated.

10 Claims, 7 Drawing Sheets

ULTRASONIC FLOW VELOCITY
MEASURING METHOD

This application is a continuation-in-part of application Ser. No. 09/557,291, filed Apr. 25, 2000 now abandoned, which in turn is a divisional of application Ser. No. 09/207,145, filed Dec. 8, 1998 now abandoned.

BACKGROUND OF THE INVENTION

The invention is related to providing a method of measuring a flow velocity using a transit time difference of ultrasonic sine waves to calculate a flow rate of fluid in a large river or open sluice way channel and a flow rate of liquid or gas in a pipe having a large inner diameter.

PRIOR ARTS

The core portion of a recent well-known ultrasonic flow rate measuring system for a large open sluice way channel or a pipe having a large inner diameter is designed to measure a flow velocity of liquid or gas. The system is normally called "a flowmeter."

Most of the flow rate measuring systems are supposed to measure the flow velocity based on a flow velocity measuring method utilizing an ultrasonic transit time difference.

Figure 1:
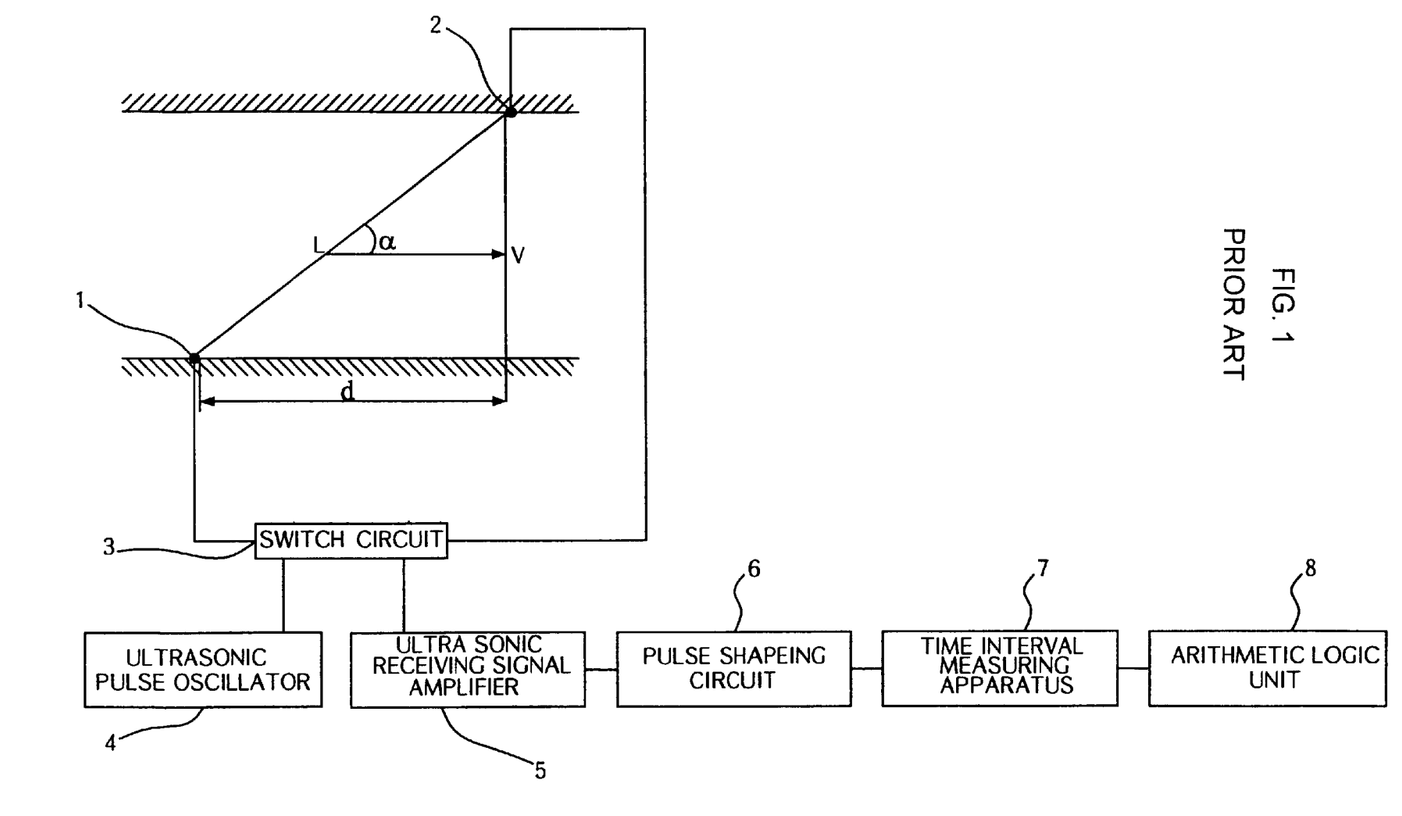
FIG. 1 is a schematic block diagram illustrating an ultrasonic transit time difference flow velocity measuring system according to a prior art.

As shown in FIG. 1, a flow velocity measuring system using an ultrasonic transit time difference operates as follows: ultrasonic transducers 1 and 2 for transmitting/receiving an ultrasonic wave are mounted at an angle $\alpha$ to face each other. A switch circuit 3 functions to switch the ultrasonic transducers 1 and 2 in turns to the inputs of transmitting and receiving circuits. An example of a transmitting and receiving circuit is an ultrasonic pulse oscillator 4 and an ultrasonic receiving signal amplifier 5. Next, a pulse shaping circuit 6 receives an amplified signal and shapes it into a pulse signal of a shorter period. A time interval measuring apparatus 7 measures transit times $t_1$ and $t_2$ at an interval distance L from the transmitting time till the receiving time. An arithmetic logic unit 8 computes a flow velocity based on expression (1).

That is to say, the transit time $t_1$, which the ultrasonic pulse is transmitted from the transducer 1 to the transducer 2 (as shown in FIG. 1), is measured. On the contrary, the transit time $t_2$, which the ultrasonic pulse is transmitted from the transducer 2 to the transducer 1, is measured. These times measured are made as follows:

$$t_1 = \frac{L}{C + V\cos\alpha}; t_2 = \frac{L}{C - V\cos\alpha}$$

Therefore, the transit time difference $\Delta t$ that $t_2 - t_1$ can be presented as follows:

$$\Delta t = \frac{2L\cos\alpha V}{C^2} \quad (1)$$

Wherein, C is a sound velocity of liquid or gas, L is an interval between transducers 1 and 2 and V is an average flow velocity in the interval L.

The flow velocity V from the expression (1) is deduced as follows:

$$V = \frac{\Delta t C^2}{2L\cos\alpha} \quad (2)$$

It may be called "A Transit Time Difference Flow Velocity Measuring Method," because the flow velocity V is proportional to the transit time difference $\Delta t$. It seems that the transit time difference flow velocity measuring method is related to the sound velocity, because there is an item $C^2$, which is the square of the sound velocity, in the expression (2). The item $C^2$ of the sound velocity must be simultaneously measured at the time of the flow velocity measurement. The square of the sound velocity is represented as follows:

$$C^2 = \frac{L^2}{t_1 \cdot t_2}$$

The sound velocity item $C^2$ is substituted into the expression (2) to make the final flow velocity measuring expression as follows:

$$V = \frac{L^2}{2L\cos\alpha} \cdot \frac{t_2 - t_1}{t_1 \cdot t_2} = \frac{L^2}{2d} \frac{t_2 - t_1}{t_1 \cdot t_2} \quad (3)$$

Then, the flow velocity is obtainable by measuring only the ultrasonic transit times $t_2$ and $t_1$ and computing the expression (3), because $L^2/2d$=const.

Typical prior arts are disclosed in U.S. Pat. No. 5,531,124 granted on Jul. 2, 1996, Japanese Patent No. 2,676,321 granted on Jul. 25, 1998, Manual of Ultrasonic flow Measuring and Apparatus thereof and Ultrasonic Flowmeter related to Model UF-2000C manufactured by the Ultra flux Co.

The transit time difference flow velocity measuring method has a great advantage in that the flow velocity measuring is simply performed as illustrated in the expression (3), even though the sound velocity is seriously changed in fluid. That is, although the expression (3) seems like being related to the square of the sound velocity according to a deliberative method of the flow velocity measuring expression, it is not principally related to the flow velocity.

For example, the difference between the reciprocal numbers with respect to the transit times $t_1$ and $t_2$ is obtained as follows:

$$\frac{1}{t_1} - \frac{1}{t_2} = \frac{2V\cos\alpha}{L},$$

The items of the sound velocity C are offset to each other. Therefore, the flow velocity V is as follows:

$$V = \frac{L}{\cos\alpha}\left(\frac{1}{t_1} - \frac{1}{t_2}\right) = \frac{L^2}{2d}\left(\frac{t_2 - t_1}{t_1 \cdot t_2}\right)$$

Wherein, $d = L\cos\alpha$.

As a result, the expression obtained is the same as the one (3).

It has a great advantage in that the transit time difference flow velocity measuring method has no relation with the change in the great range of the sound velocity C in fluid. But, the transit time difference flow velocity measuring method is limited to its using. For example, when the transit distance L is very small and/or the flow velocity V is very low, it is very difficult to measure the flow velocity, precisely. If L=0.05 m, V=0.1 m/s, α=45° and C≈1500 m/s, Δt≈3.14×10⁻⁹ s.

If it is intended to measure a very little time difference within the error range of 1%, the time difference absolute measuring error should not exceed the range of 3×10⁻¹¹ s. Measuring the time difference based on such a method needs a relative complex time interval measuring apparatus. Also, an apparatus for catching moments of transmitting/receiving the ultrasonic pulses must be very stable and precise. As mentioned below, the transit time difference flow velocity measuring method causes many problems, when the gas flow velocity is measured in a pipe, or the horizontal flow velocity is measured in a channel or river.

In addition to the transit time difference flow velocity measuring method, an ultrasonic phase difference flow velocity measuring method is also well known. For example, there are Dutch Patent Laid-Open Publication No. DE19722140 published on Nov. 12, 1997, and Japanese Patent Laid-Open Publication No. Hei 10-104039 published on Apr. 24, 1998, both of which are entitled: "A multi-channel flow rate measuring system."

Figure 2A:
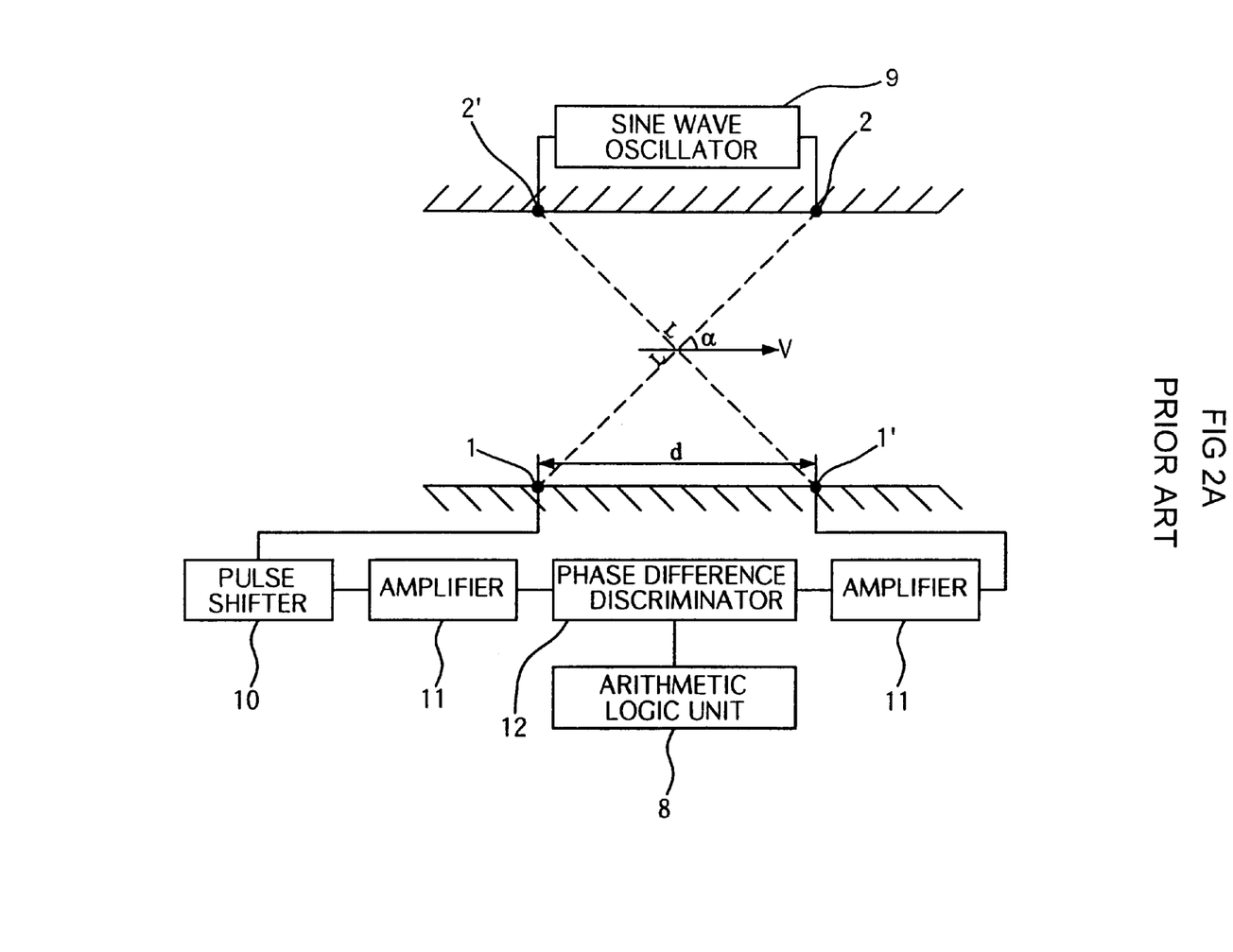
FIGS. 2A and 2B are schematic block diagrams illustrating an ultrasonic phase difference flow velocity measuring system according to a prior art.
Figure 2B:
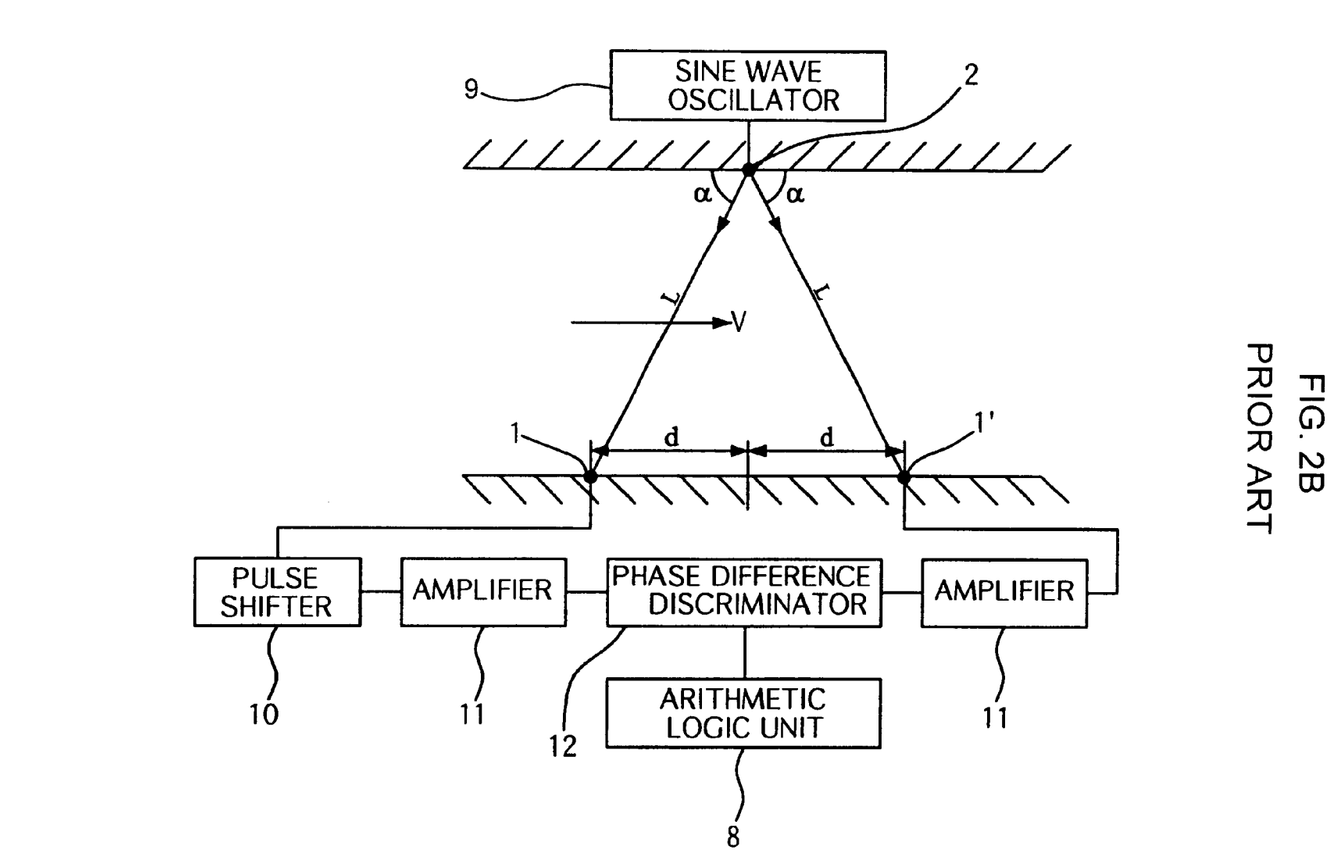

FIGS. 2A and 2B show a typical configuration of a phase difference flow velocity measuring system. Ultrasonic transducers 1, 1' and 2, 2' are positioned to face each other. A sine wave oscillator 9 generates a sine wave having a frequency f. A phase shifter 10 adjusts the phase of received ultrasonic signals. An amplifier 11 amplifies the received signals from the phase shifter 10 and the transducer 1'. A phase difference discriminator 12 measures the phase difference between the received phase signals. When the sine wave oscillator 9 is operated, the transducers 2 and 2' transmit ultrasonic waves at the same phase. At that time, the phase signals, which the receiving transducers 1 and 1' receive, are as follows:

$$\phi_1 = 2\pi f \cdot t_1 + \phi_0; \quad \phi_2 = 2\pi f t_2 + \phi_0$$

Wherein, $$t_1 = \frac{L}{C - V\cos\alpha}; \quad t_2 = \frac{L}{C + V\cos\alpha}$$

$\phi_0$ is an initial phase that the ultrasonic wave is firstly transmitted. Therefore, the phase difference $\Delta\phi$ between the received signals is as follows:

$$\Delta\varphi = \varphi_1 - \varphi_2 = 2\pi f \Delta t = 2\pi f \frac{2LV\cos\alpha}{C^2} \quad (4)$$

Herein, the flow velocity is as follows:

$$V = \frac{\Delta\varphi C^2}{4\pi f L\cos\alpha} \quad (5)$$

The phase difference method has features in that the ultrasonic waves can be continuously transmitted and the phase difference $\Delta\phi$ is proportional to the frequency $f$ unlike the transit time difference method. Therefore, even if L and V are very small, when the ultrasonic frequency $f$ is selected at a higher one, the phase difference becomes larger, so that the phase difference measuring is conveniently and precisely done.

Also, if L is relatively larger, the damping factor is very small over the ultrasonic pulse, because the ultrasonic continuous waves are transmitted/received. Further, even though the amplitude of the received signal significantly pulsates, the received signal can be sufficiently amplified, because the receiving moment is not measured. And, an automatic gain control circuit can be used in the method. It means that there is not any problem in measuring the phase difference at all. Only, the phase difference method is preferably used under the condition that the sound velocity C is almost not changed or in the case that any other means measures the sound velocity C. For example, in order to measure the gas flow rate, the sound velocity of gas can be easily calculated under the condition that a pressure gauge and a thermometer are mounted in the pipe.

As mentioned above, the great advantage of the ultrasonic transit time difference method can be utilized even under the situation that the sound velocity in fluid is significantly changed. But, if the interval L between the transducers becomes larger, the following problems occur due to the transmitting/receiving of the ultrasonic pulse.

First, the ultrasonic pulse has a larger damping factor over the sine wave because of its sufficient harmonic wave components or overtones. If the ultrasonic transit distance L becomes larger, it is difficult to receive the transmitted ultrasonic wave and the received pulse becomes a bell form due to the serious damping problem.

For all that, it cannot help increasing the ultrasonic wave intensity that can be auxiliarily adjusted. If the intensity becomes higher, the cavity phenomenon occurs in a river, so that the ultrasonic wave is not transmitted. Especially, as the pulse frequency becomes lower in order to reduce the damping factor, the ultrasonic intensity also becomes lower, which causes the cavity phenomenon.

Second, the ultrasonic pulse is not damped only by the distance L in the procedure of being transmitted, but the amplitude of the ultrasonic wave seriously pulsates, by which the ultrasonic wave is diffused and reflected because of various sizes of eddy currents, the concentration change of floating particles, the temperature change of water, etc. in the open sluice way channel. It sometime happens that the ultrasonic wave is not received.

When the flow velocity of gas is measured, the damping factor of the ultrasonic pulse is larger than that in liquid. The serious damping and pulsation of the ultrasonic pulse cause many errors, when it is subjected to catch the moment that the ultrasonic pulse reaches. Thus, the flow velocity measuring error is increased.

Due to these reasons, the ultrasonic transit distance L is limited in that the ultrasonic pulse is transmitted/received and the flow velocity is measured based on a time difference method. Thus, it has great difficulty in measuring the flow velocity in a large open sluiceway channel or river or a larger pipe.

If the phase difference method is used for measuring the flow velocity, its damping factor is decreased two or three times over that of the ultrasonic pulse, because the ultrasonic continuous waves (sine waves) are transmitted/received. Also, the phase difference method is not relevant to the amplitude pulsation of the received signals, because it is not related to catching the moment that the ultrasonic pulse reaches, but the phase difference between two sine waves is measured. Nevertheless, the phase difference method is limited to its use. If the phase difference $\Delta\phi$ between two sine waves is equal to $m\pi+\beta$, a general phase difference measuring apparatus cannot detect m (1, 2, 3, . . . ). If the ultrasonic transit distance L or the flow velocity V is larger, $\Delta\phi$ becomes greater than $\pi$. For example, if it is intended to measure the flow rate of gas in the pipe having an inner diameter Φ of 300 mm, the cross-sectional average flow velocity V of gas is generally 10–30 m/s. Then, assuming that the sound velocity C is 400 m/s, the ultrasonic frequency $f$ is selected at 400 KHz in order to be beyond the frequency band of noises and an angle α is 45°, the changing width of the phase difference Δφ is as follows:

$$\Delta\phi = 9.42 \sim 28.26 \, rad \approx (2\pi + 0.998\pi) \sim (8\pi + 0.995\pi)$$

That is, Δφ>π.

If L=10 m, V=3 m/s, $f$=200 KHz and C=1500 m/s in a relatively smaller open channel, the phase difference Δφ is as follows:

$$\Delta\phi \approx 16.746 \, rad = 5\pi + 0.33\pi > \pi.$$

Thus, the phase difference method cannot be used in measuring the flow velocity in the relatively smaller open channel. In other words, the transit time difference method has an advantage in being used under the situation that the sound velocity is changed to a larger range. But, it has disadvantages in that if the flow velocity-measuring interval L is larger, the ultrasonic pulse becomes unstable, because the ultrasonic pulse is greatly damped due to its own property during the transmitting/receiving.

The phase difference method has advantages in that the damping factor is relatively smaller and the received signal is easily processed, because the ultrasonic sine wave is transmitted/received. But, if the phase difference exceeds π radians by which the interval L and the flow velocity V is larger or the sound velocity is lower, it is not possible to measure the flow velocity based on the phase difference method. Also, the phase difference method has a disadvantage in that the sound velocity should be separately measured.

An object of the invention is to provide an ultrasonic flow velocity measuring method based on a transit time difference of continuous ultrasonic sine waves, if a flow velocity measuring interval L is relatively larger, for example if a horizontal average flow velocity is measured in an open sluice way channel or river.

The other object of the invention is to provide an ultrasonic flow velocity measuring method based on a transit time difference of continuous ultrasonic sine waves, smoothly, if a flow velocity measuring interval L is relatively larger, for example if a gas flow velocity is measured in a pipe of a relatively larger inner diameter.

Another object of the invention is to provide an ultrasonic flow velocity measuring method based on a transit time difference of continuous ultrasonic sine waves, smoothly, if a gas or liquid flow velocity is measured in a pipe of a relatively larger inner diameter.

Still another object of the invention is to provide an ultrasonic flow velocity measuring method based on a transit time difference of continuous ultrasonic sine waves, if a flow velocity is relatively larger and the sound velocity is relatively lower.

SUMMARY OF THE INVENTION

According to the present invention, an ultrasonic flow velocity measuring method based on a transit time difference of continuous ultrasonic sine waves without transiting/receiving an ultrasonic pulse comprises: amplitude-modulating a continuous ultrasonic sine wave carrier into a lower frequency and transiting the amplitude-modulated signal, whenever the ultrasonic transit time is measured; demodulating the amplitude-modulated signal; detecting or discriminating the amplitude-modulated signal from the demodulated signal and measuring a time interval from the moment that the ultrasonic sine wave is amplitude-modulated until the amplitude-modulated signal is demodulated.

BRIEF DESCRIPTION OF THE DRAWINGS

The invention now will be described in detail with reference to the accompanying drawings, in which.

DETAILED DESCRIPTION OF THE INVENTION

Figure 3:
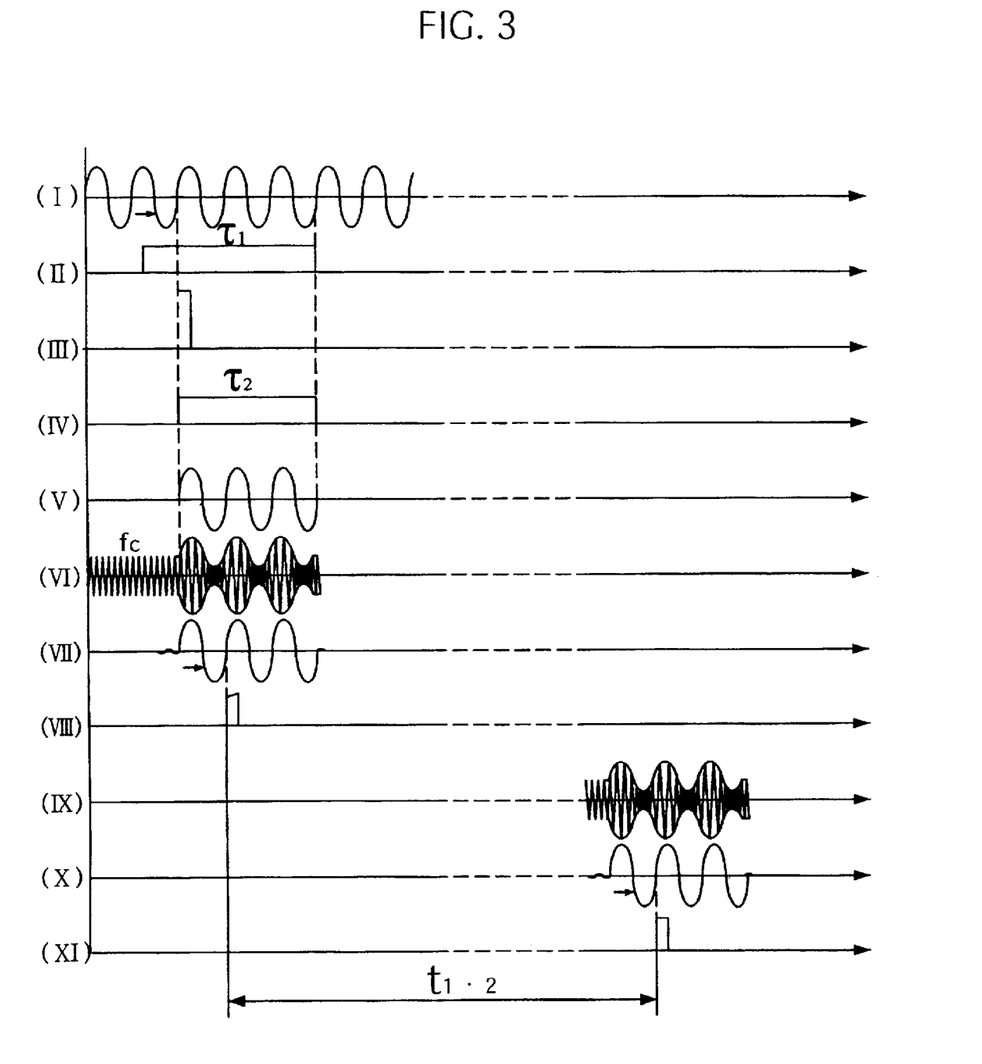
FIG. 3 is a timing chart illustrating the processing of an ultrasonic transit time difference flow velocity measuring method according to the invention.

Firstly, an ultrasonic transit time difference flow velocity measuring method of the invention will be explained in detail referring to the accompanying drawings:

FIG. 3 is a timing chart or sequence illustrating a flow velocity measuring method. It is known that a carrier frequency $f_C$ is generally selected by considering a noise frequency band caused in the fluid flowing, the security with respect to the directivity diagram of an ultrasonic transducer, an ultrasonic damping factor in fluid, etc.

When a flow velocity is measured, the selected ultrasonic wave of the carrier frequency $f_C$ (FIG. 3, VI) is amplitude-modulated into a signal of an amplitude-modulation frequency $f_M$ (FIG. 3, I) lower than the carrier frequency $f_C$ for a period of $\tau_2$ (FIG. 3, V) and then transited in a direction similar or contrary to the flow velocity. And, if a time point to be amplitude-modulated is considered as a starting point, a time is measured from the starting point till a designated falling edge of a signal of the amplitude-modulation frequency $f_M$, while the amplitude-modulated ultrasonic wave is transited/received through a constant interval distance L and the received signal is demodulated. The time is defined into ultrasonic transit times $t_1$ and $t_2$ propagated in a direction similar or contrary to the flow velocity. In other words, the amplitude-modulated ultrasonic wave acts as a mark signal for measuring the transit time of the ultrasonic wave. And, because the ultrasonic wave is a kind of a sine wave that is continuously transited and amplitude-modulated for a constant time interval to measure the flow velocity, the ultrasonic frequency band is $f_C \pm f_M$, which is significantly narrower than that of the shorter ultrasonic pulse, so its damping factor becomes smaller. And, even if the damping factor is changed too much, the processing of the receiving signal is easy and it doesn't make an effect on the measuring of the transit time.

But, when the signal of the ultrasonic carrier frequency $f_C$ is amplitude-modulated into the signal of the amplitude-modulation frequency $f_M$, it should be amplitude-modulated at the same phase as that of the amplitude-modulation frequency $f_M$, for example a zero phase as shown in FIG. 3, V. When the amplitude-modulated voltage is applied to the ultrasonic transducer, the ultrasonic wave of a type equal to the voltage applied is not transited, but a first half-period of a modulated ultrasonic wave is distorted in a shape. Furthermore, a signal obtained by receiving/demodulating the amplitude-modulated ultrasonic wave is not corresponding to the shape of the signal of the amplitude-modulation frequency $f_M$. Considering these points, the amplitude-modulated signal applied to the ultrasonic transducer is inputted into a demodulator to be demodulated, the signal of the amplitude-modulation frequency $f_M$ is detected from the demodulated signal, and the moment that the first period of the modulation signal passes over the zero potential is caught using a zero-crossing discriminating circuit. Herein, the moment caught is considered as a starting point for measuring the ultrasonic transit time as shown in FIG. 3, VII and VIII.

Similarly, the amplitude-modulation signal received is also demodulated by the demodulator as mentioned above, the signal of the amplitude-modulation frequency $f_M$ is detected from the demodulated signal, and then the moment that the first period of the modulation signal passes over a zero-crossing point is caught to function as a stop signal of the time interval as shown in FIG. 3, X and XI.

As described above, the ultrasonic transit time measuring accuracy can be significantly enhanced, by which only one demodulator demodulates the transiting/receiving signals and the moments that the first period of the demodulation signal pass over the zero-cross point are used as the time interval measuring start and stop signals.

As shown in FIG. 3, VIII and XI, it is irrelevant to use the moments that one and a half period of the signal having the amplitude-modulation frequency $f_M$, not the first half period, passes over the zero-crossing point as the time interval measuring start and stop signals. Of course, the delay time is generated at the demodulator, the amplifier, the zero-crossing circuit etc., but it is not necessary to compensate for the delayed time, because the system generates the same delayed time, whenever the flow velocity is measured.

And, the signal of the amplitude-modulation frequency $f_M$ should catch up with the following conditions:

The first condition is when the signal of the amplitude-modulation frequency $f_M$ is significantly higher than a damping pulsation frequency $f_P$, for example $f_M \gg f_P$. The ultrasonic wave has the damping factor changed due to many factors during the transiting in fluid. What the damping factor is changed is to make the ultrasonic wave amplitude-modulated. Thus, the amplitude-modulation frequency $f_M$ should be higher than the damping pulsation frequency $f_P$ in that the damping factor pulsates, which is not a noise frequency generated in fluid. The damping pulsation frequency $f_P$ is not high and does not exceed 100 Hz, generally.

The second condition is when a carrier period should be contained more than 20th times in an amplitude-modulation period, for example $f_M \gg f_C/20$. The condition concerns the amplitude-modulation of the carrier frequency $f_C$, in which the phase of the carrier frequency $f_C$ at the start point of the amplitude-modulation is not always uniform, even if the signal of the carrier frequency $f_C$ is amplitude-modulated at a zero-crossing point as shown in FIG. 3, V. For it, the amplitude-modulated ultrasonic wave raises the transient phenomena and distorts the waveform in the interval of a first one-fourth period of the signal of the amplitude-modulation frequency $f_M$. In order to prevent a wave-distorted portion from exceeding one-fourth period, the carrier $f_C$ should include at least five periods in the first one-fourth period of the signal of the amplitude-modulation frequency $f_M$. Thus, the signal of the carrier frequency $f_C$ should exist over 20 (=4×5) in one period of the amplitude-modulation signal $f_M$. In addition, it is preferable that the carrier frequency $f_C$ is higher than the amplitude-modulation frequency $f_M$ in order to filter the signal of the amplitude-modulation frequency $f_M$ from the pulsating signal of the carrier frequency $f_C$.

The third condition is when the continuous time of amplitude-modulated signals desirably exceeds at least five periods of the signal of the amplitude-modulation frequency $f_M (5/f_M)$, if the amplitude-modulated signal is demodulated to detect the signal of the amplitude-modulation frequency $f_M$. If the amplitude-modulated signal having the amplitude-modulation period to be repeated two or three times is demodulated, the outputting signal of the demodulator is distorted.

The fourth condition is when the ultrasonic wave is transited/received in turns in a direction similar or contrary to the flow velocity, it is desirable that the continuous time of the amplitude-modulated ultrasonic wave does not exceed one-second of the ultrasonic transit time. The example is as follows:

$$5/f_M \leq \frac{L}{2(C+v)} \quad \text{or} \quad f_M \geq \frac{10(C+v)}{L}$$

As described above, the signal of the amplitude-modulation frequency $f_M$ satisfied with four conditions is selected by the following expression:

$$f_P \ll 10\left(\frac{C_{\max} + v_{\max}}{L}\right) \leq f_M \leq 0.05 f_C \tag{6}$$

Wherein, $C_{max}$ is a maximum sound velocity that can be expected in fluid, and $v_{max} (=V_{max}\cos\alpha)$ is a maximum flow velocity measuring value.

It is preferable in selecting the amplitude-modulation signal $f_M$ satisfying with the expression (6) that the relatively lower frequency is selected if possible, because the transient phenomena happens, when the voltage applied to the ultrasonic transducer is rapidly changed. It is desirable that the amplitude-modulation percentage m does not exceed 50%. According to the experiments, the amplitude-modulation percentage m of 25–30% is very reasonable. The ultrasonic damping factor pulsates at the lower frequency $f_P$, the changing ratio of which is generally about 50%. Thus, if m>50%, it is likely that the amplitude-modulated wave is cut off. For example, assuming that L=10 m, $\alpha$=45°, $C_{max}$=1500 m/s, $f_C$=500 KHz, $f_P \ll 1507 < f_M \leq 25 \times 10^3$ Hz. Thus, $f_M$ can be selected in the range of 10 to 20 KHz. Considering the transient phenomena of the ultrasonic wave, it is not necessary to select the signal of the higher amplitude-modulation frequency $f_M$ that is equal to 25 Hz.

Figure 4:
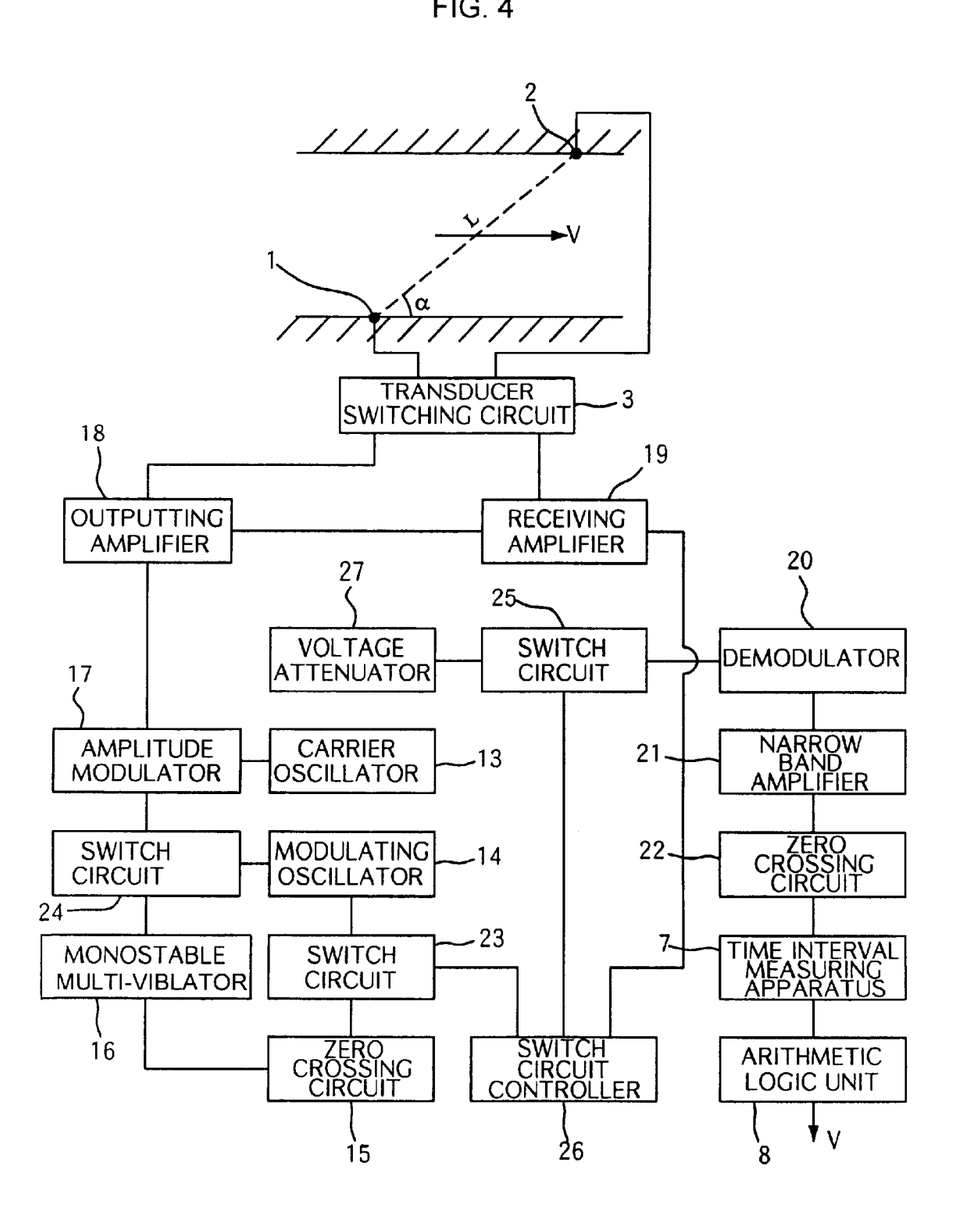
FIG. 4 is a schematic block diagram illustrating an ultrasonic transit time difference flow velocity measuring system according to the invention.

FIG. 4 is a schematic block diagram illustrating the configuration of a system according to one embodiment of the invention for realizing a method of measuring a flow velocity as described above.

Ultrasonic transducers 1 and 2 are connected to a transducer switching circuit 3 to be switched into the transiting or receiving state. An outputting amplifier 18 excites the ultrasonic transducer 1 or 2. A receiving amplifier 19 amplifies the signals from the ultrasonic transducer 1 or 2, which is a narrow band amplifier that has the function of the automatic gain control (AGC) and amplifies only the frequency band of an amplitude-modulation signal.

An amplitude-modulator 17 amplitude-modulates a signal of an ultrasonic carrier frequency $f_C$. A carrier oscillator 13 generates the signal of an ultrasonic carrier frequency $f_C$. A modulating oscillator 14 generates a modulation signal of an amplitude-modulation frequency $f_M$ lower than the carrier frequency $f_C$. Herein, both of the carrier oscillator 13 and the modulating oscillator 14 are sine wave oscillators. A demodulator 20 demodulates the amplitude-modulated signal to detect the amplitude modulation frequency $f_M$. A narrow band amplifier 21 is a narrow band amplifier that amplifies the signal of the amplitude-modulation frequency $f_M$. A zero-crossing circuit 22 outputs a square pulse, when a first period of the outputting signal of the amplitude modulation frequency $f_M$ from the narrow band amplifier 21 passes over the zero point. A time interval measuring apparatus 7 measures the time interval between two pulses. An arithmetic logic unit 8 computes a flow velocity based on an ultrasonic transit time difference flow velocity measuring expression. A switch circuit 23 permits the outputting signal of the amplitude-modulation frequency $f_M$ from the modulating oscillator 14 to be passed therethrough in a given time interval. A zero-crossing circuit 15 generates a square pulse, when the first period of the signal of the amplitude-modulation frequency $f_M$ passes over the zero-point. A monostable multivibrator 16 is operated by the zero-crossing circuit 15 to generate a pulse of a given length.

A switch circuit 24 is switched by the pulse of the monostable multivibrator 16 to allow the outputting signal of the modulation oscillator 14 to be applied to the amplitude-modulator 17. A switch circuit 25 allows an ultrasonic modulated output to be applied to the demodulator 20 and then is switched to permit the outputting signal from the receiving amplifier 19 to be inputted into the amplitude-modulator 20. A voltage attenuator 27 adjusts the outputting voltage of the outputting amplifier 18. A switch circuit controller 26 controls the switch circuits 3, 23 and 25.

The operation of the ultrasonic flow velocity measuring system as shown in FIG. 4 will be explained in detail below with reference to FIG. 3.

The carrier oscillator 13 and the modulation oscillator 14 are firstly oscillated to generate sine waves of the ultrasonic carrier frequency $f_C$ and the amplitude-modulation frequency $f_M$, respectively, as shown in FIG. 3, VI and I. When a flow velocity measuring moment reaches, the switch circuit controller 26 applies a square pulse of a length $\tau_1$ (referring to FIG. 3, II) to the switch circuit 23. The switch circuit 23 permits the signal of the amplitude modulation frequency $f_M$ from the modulation oscillator 14 to be inputted to the zero-crossing circuit 15. Then, as the operation potential level of the zero-crossing circuit 15 is set at a low level "−" (negative level), the zero-crossing circuit 15 generates a square pulse (referring to FIG. 3, III), when the first one-half period of the outputting signal from the modulation oscillator 14 passes through the zero point (U=0). The square pulse is inputted into the monostable multivibrator 16, and the monostable multivibrator 16 generates a square pulse of the length $\tau_2$ (FIG. 3, IV). The square pulse of $\tau_2$ switches the switch circuit 24 in order to permit the signal of the amplitude-modulation frequency $f_M$ from the modulation oscillator 14 to be inputted to the amplitude-modulator 17. Thus, the signal of the ultrasonic carrier frequency $f_C$ is amplitude-modulated for the time of $\tau_2$ as shown in FIG. 3, VI. Like it, the ultrasonic carrier frequency $f_C$ is always supposed to be amplitude-modulated into the same phase of the amplitude-modulation frequency $f_M$.

The amplitude-modulated signal from the amplitude-modulator 17 is amplified by the outputting amplifier 18 and then applied to the ultrasonic transducer 1. The ultrasonic transducer 1 transits the amplitude-modulated ultrasonic wave through fluid to the transducer 2.

At the same time, the outputting signal of the outputting amplifier 18 is inputted through the voltage attenuator 27 and the switch circuit 25 to the demodulator 20 to detect the modulation signal $f_M$ (FIG. 3, VII). The narrow band amplifier 21 amplifies the amplitude-modulation signal demodulated by the demodulator 20 and applies the amplified signal to the zero-crossing circuit 22. The zero-crossing circuit 22 generates a shorter square pulse (FIG. 3, VIII) at the moment that the first one and a half period "−" of the signal of the modulation frequency $f_M$ passes through the zero-point. The shorter square pulse is inputted into the time interval measuring apparatus 7 to function as a time measuring start signal.

Thereafter, the switch circuit 25 cuts off the input to the attenuator 27 and forces the outputting signal from the receiving amplifier 19 to be applied to the demodulator 20. In other words, the amplitude-modulated ultrasonic wave which is transited from the transducer 1 through an interval distance L is received by the transducer 2 and amplified by the receiving amplifier 19. The outputting signal (FIG. 3, IX) from the receiving amplifier 19 is applied through the demodulator 20 and the amplifier 21 to the zero-crossing circuit 22. The zero-crossing circuit 22 generates the shorter square pulse (FIG. 3, XI) and applies it to the time interval measuring apparatus 7 to function as a time measuring stop signal.

Therefore, the time interval measuring apparatus 7 measures the time interval $t_1$ between the first and second square pulses from the zero-crossing circuit 22. After finishing the measurement of the time interval $t_1$, the transducer switch circuit 3 is switched to connect the transducer 2 to the outputting amplifier 18. Then, the switch circuit 25 is connected to the attenuator 27, and the switch circuit 23 is switched, again. And, the next operations are repeated in the same manner as the measuring ones of the time interval $t_1$. Therefore, a time $t_2$ is measured until the amplitude-modulated ultrasonic wave is transited from the transducer 2 and received by the transducer 1.

The time intervals $t_1$ and $t_2$ are inputted into the flow velocity arithmetic logic unit 8 to compute the flow velocity based on the flow velocity measuring expression (3). The flow velocity arithmetic logic unit 8 outputs a signal corresponding to the flow velocity V. The outputting signal of the flow velocity V is provided to a flow rate measuring arithmetic logic unit (not shown), if the system is a flow rate measuring system.

Herein, important things are as follows: it has features in that in order to measure the time intervals $t_1$ and $t_2$, the amplitude-modulated outputting signal inputted into the transducer 1 (or 2), the signal received by the transducer 2 (or 1) pass through one demodulator and the zero-crossing circuit, and the start and stop pulse signals inputted into the time interval measuring apparatus 7 are shaped into a square pulse.

The well-known phase difference flow velocity measuring expression (5) depends on the square of the sound velocity ($C^2$). In the expression (5), $\Delta\phi$ also is a phase difference between the ultrasonic waves transited in the directions similar and contrary to the flow velocity. Except for the flow velocity measuring method of the expression (5), a phase difference flow velocity measuring expression that does not depend on the sound velocity C can be derived.

The phase difference $\Delta\psi_1$ between the ultrasonic transiting wave and the received wave next to be transited toward the flow velocity direction and the phase difference $\Delta\psi_2$ between the ultrasonic transiting signal and the received signal next to be transited in a direction contrary to the flow velocity are as follows:

$$\Delta\psi_1 = 2\pi f \frac{L}{C+\upsilon} \quad \Delta\psi_2 = 2\pi f \frac{L}{C-\upsilon} \quad (7)$$

Wherein, $\upsilon = V\cos\alpha$, and L is an interval distance between ultrasonic transducers.

The difference between the reciprocal numbers of the phase differences $\Delta\psi_1$ and $\Delta\psi_2$ is as follows:

$$\frac{1}{\Delta\psi_1} - \frac{1}{\Delta\psi_2} = \frac{2V\cos\alpha}{2\pi fL} \quad (8)$$

Wherein, V is as follows:

$$V = \frac{\pi fL}{\cos\alpha}\left(\frac{1}{\Delta\psi_1} - \frac{1}{\Delta\psi_2}\right) \quad (9)$$

The flow velocity measuring method is highly worth being used, because it is not necessary to measure the sound velocity, separately, even under the condition that the sound velocity is significantly changed. But, only if the measuring error of the phase differences $\Delta\psi_1$ and $\Delta\psi_2$ are very small enough to be ignored, the flow velocity can be measured based on the expression (9).

For example, $\Delta\psi_1$=2.0 radians, and $\Delta\psi_2$=2.2 radians. Assuming that the phase differences are measured in the range of the error of 0.5%, the measured phase differences are as follows:

$\Delta\psi_1'$=2.0(1+1.005)=2.01

$\Delta\psi_2'$=2.2(1−0.005)=2.189

As a result, $$\frac{1}{\Delta\psi_1'} - \frac{1}{\Delta\psi_2'} = 0.040682835$$

But, the actual value is as follows:

$$\frac{1}{2.0} - \frac{1}{2.2} = 0.0454545$$

Therefore, the error is as follows:

$$\frac{0.0406828 - 0.04545}{0.04545} = -0.105 = 10.5\%$$

That is to say, the phase difference was measured in range of the error of 0.5%, but the error between the differences of the reciprocal numbers with respect to the phase differences was increased more than 20 times. Thus, the flow velocity measuring error was more than 10%.

In order to realize the phase difference of the flow velocity measuring method not depending on the sound velocity C, the phase difference must be very precisely measured.

It appears that the following problem from the expression (7) happens. As the interval distance L is increased, the sound velocity C is lowered, and the ultrasonic frequency is increased, the phase difference $\Delta\psi_{1,2}$ is too much increased more than $\pi$. Of course, if L, C and $\upsilon$ are given, the ultrasonic frequency $f$, which enables the phase difference $\Delta\psi$ not to exceed the measuring range $\pi$ of a general phase difference discriminator, can be selected, but it must be far too much higher than a noise frequency band generated in fluid.

For example, assuming that the inner diameter D of a natural gas pipe is equal to 0.3 m, C≈420 m/s, V=30 m/s, $\alpha$=45° and L=0.425 m, the ultrasonic frequency $f$ that does not exceed the phase difference $\pi$ is as follows:

$$f \leq \frac{C + V\cos\alpha}{2\pi L} = \frac{420 + 30 \cdot \cos 45°}{2\pi \cdot 0.424} = 165.6 \text{ HZ}$$

Such like a frequency band is included in a noise frequency one. Furthermore, it makes it impossible to manufacture a compact transducer that transits the sound wave of 165 Hz.

In order to be escaped from the noise band, if the ultrasonic carrier frequency $f_C$ is selected to be 40 KHz, the phase difference in said examples is as follows:

$$\Delta\psi_1 = 2\pi \cdot 4 \cdot 10^4 \cdot \frac{0.424}{420 + 30\cos\alpha} = 241.522 \cdots \text{rad} > 76\pi + \beta$$

Herein, the general phase difference discriminator cannot measure $76\pi$.

In order to resolve these problems, the invention selects an ultrasonic carrier frequency $f_C$ escaped far away from the noise band as a carrier, amplitude-modulates it into an amplitude-modulation frequency $f_M$ lower than the ultrasonic carrier frequency $f_C$, transits it in the directions similar and contrary to the flow velocity and measures the phase differences between the transiting signal and the received signal as follows:

First, the amplitude-modulation frequency $f_M$ is selected so that the phase differences $\Delta\psi_{M1}$ and $\Delta\psi_{M2}$ between the transiting wave of an amplitude-modulated signal and a signal that is received and demodulated next to be transited in the direction contrary to the flow velocity satisfy with the following conditions:

$$\Delta\Psi_{M1} = 2\pi f_M \frac{L}{C_{\max} + \upsilon_{\max}} = n\pi + b\pi \quad (10)$$

$$\Delta\Psi_{M2} = 2\pi f_M \frac{L}{C_{\min} - \upsilon_{\max}} = n\pi + a\pi$$

Wherein, n=const (1, 2, 3, . . . ); a <1.0, b<1.0, $C_{max}$ and $C_{min}$ are maximum and minimum sound velocities in fluid and $v_{max}=V_{max}\cos\alpha$, which is a maximum flow velocity measuring range.

In this case, as $n\pi$ is previously known, the phase differences $\Delta\psi_{M1}$ and $\Delta\psi_{M2}$ are supposed to be measured, only if $a\pi$ and $b\pi$ are measured and next $n\pi$ is added thereto. Herein, $a\pi$ is a maximum measuring limit and $b\pi$ is a lowest measuring limit. Because it is unstable, if a=1 and b=0, it is desirable that a is selected to be 0.95, and b is selected to be 0.2.

The n that satisfies with expression (10) is as follows:

The relative expression from the expression (10) is given as follows:

$$\frac{n+b}{n+a} = \frac{C_{min} - v_{max}}{C_{max} + v_{max}}$$

Wherein, n is as follows:

$$n = \frac{a(C_{min} - v_{max}) - b(C_{max} + v_{max})}{C_{max} - C_{min} + 2v_{max}} \quad (11)$$

The amplitude-modulation frequency $f_M$ based on such like obtained n is as follows:

$$f_M = \frac{n+a}{2L}(C_{min} - v_{max}) \text{ or,} \quad (12)$$

$$f_M = \frac{n+b}{2L}(C_{max} + v_{max})$$

Therefore, the signals of the carrier frequency $f_C$ are amplitude-modulated into the selected amplitude-modulation frequency $f_M$, and the amplitude-modulated signal is transited/received. At that time, if the phase differences $\Delta\psi_{M1}$ and $\Delta\psi_{M2}$ between the signals of amplitude-modulation frequency $f_M$ transited and received are measured in the range of a constant error $\delta_M$, the calculation results of the phase differences $\Delta\psi_{M1}$ and $\Delta\psi_{M2}$ are as follows:

$$\Delta\psi'_{M1} = n\pi + b\pi(1 \pm \delta_M) \quad (13)$$

$$\Delta\psi'_{M2} = n\pi + a\pi(1 \pm \delta_M)$$

Wherein, $a\pi = \Delta\psi_{MM1}$ and $b\pi = \Delta\psi_{MM2}$, which are phase differences that the phase difference discriminator can measure. Multiplying the phase difference by $f_C/\pi f_M$ becomes a value that divides the phase differences $\Delta\psi_{C1}$ and $\Delta\psi_{C2}$ between the carrier frequencies into $\pi$.

$$\Delta\Psi'_{M1} \times \frac{f_c}{\pi f_M} = m_1 + \beta \quad (14)$$

$$\Delta\Psi'_{M2} \times \frac{f_c}{\pi f_M} = m_2 + \gamma$$

Wherein, $\beta<1.0$, $\gamma<1.0$ and $m_1$ and $m_2$ are integers (1, 2, 3, 4, ...).

If the phase differences $\Delta\psi_{C1}$ and $\Delta\psi_{C2}$ are measured as described above, it is noted that $m_1\pi + \beta\pi$ and $m_2\pi + \gamma\pi$ are obtainable.

The values that the discriminator measures the phase difference between the carrier frequencies are as follows:

$$\Delta\Psi'_{CM1} = \beta\pi(1 \pm \delta_c) \quad (15)$$

$$\Delta\Psi'_{CM2} = \gamma\pi(1 \pm \delta_c)$$

If the $m_1\pi$ and $m_2\pi$ are added to the measured values, the difference between a phase upon the transiting of the carrier frequency wave and a phase of the received signal next to be transited in the direction contrary to the flow velocity are as follows:

$$\Delta\Psi'_{C1} = m_1\pi + \beta\pi(1 \pm \delta_c) \quad (16)$$

$$\Delta\Psi'_{C2} = m_2\pi + \gamma\pi(1 \pm \delta_c)$$

The phase differences $\Delta\psi_{C1}'$ and $\Delta\psi_{C2}'$ obtained like above are substituted into the flow velocity measuring expression to compute the flow velocity as follows:

$$V' = \frac{\pi f_C L}{\cos\alpha}\left(\frac{1}{\Delta\Psi'_{C1}} - \frac{1}{\Delta\Psi'_{C2}}\right) \quad (17)$$

If the phase difference of the carrier frequencies is measured according to the above method, the measuring error is reduced tens or hundreds times over the error $\delta_C$ of the phase difference discriminator.

$$\delta_{\Delta\Psi_1} = \frac{\Delta\Psi'_{C1} - \Delta\Psi_{C1}}{\Delta\Psi_{C1}} = \frac{\beta\pi\delta_C}{m_1\pi + \beta\pi} = \frac{\pm\delta_C}{1 + \frac{m_1}{\beta}} \quad (18)$$

$$\delta_{\Delta\Psi_2} = \frac{\Delta\Psi'_{C2} - \Delta\Psi_{C2}}{\Delta\Psi_{C2}} = \frac{\pm\delta_C}{1 + \frac{m_2}{\gamma}}$$

Wherein, $m_1$ and $m_2 \gg 1$, $\beta$ and $\gamma < 1.0$. Thus, $\delta_{\Delta\Psi_{C1}}$ and $\delta_{\Delta\Psi_{C2}}$ are too much smaller than $\delta_C$.

As described above, according to the invention, because the phase difference is accurately measured when the ultrasonic wave is transited and received, the flow velocity can be measured based on the phase difference flow velocity measuring expression not depending upon the sound velocity. Also, even if L and V are larger, C is lower and the phase difference between the ultrasonic waves exceeds far away from $\pi$ radians, the flow velocity can be easily measured.

For example, when the flow velocity of natural gas flowing in a pipe having an inner diameter of 300 mm is measured, it is assumed that $C_{min}=420$ m/s, $C_{max}=650$ m/s, $L=0.425$ m, $V_{max}\cos\alpha=30$ m/s and the ultrasonic carrier frequency $f_C$ is selected at 40 KHz by considering the noise in the pipe. Assuming that as the measuring range of the phase difference discriminator is $0-\pi$, $b\pi$ is selected as $0.2\pi$, for example b=0.2, when the phase difference becomes minimum in the range, and $a\pi$ is selected as $0.95\pi$, for example a=0.95, when the phase difference becomes maximum in the range, the amplitude-modulation frequency $f_M$ is as follows:

$$n = \frac{0.95(420-30) - 0.2(450+30)}{450-420+2\cdot30} = 3.05$$

Assuming that n is selected at 3 and stored at the memory of the system, $$f_M \leq \frac{3.05+0.95}{2\cdot0.424}(420-30) = 1839.62 \text{ HZ}$$

Assuming that $f_M$ is selected at 1830 Hz, during the transiting of the ultrasonic wave amplitude-modulated into the amplitude-modulation frequency $f_M$ of 1830 Hz in the directions similar and contrary to the flow velocity, the received signal is demodulated to detect the amplitude-modulation frequency $f_M$. Then, if the phase difference between the phase of the amplitude-modulation frequency $f_M$ of the transiting signal and the receiving signal phase is measured, the results are as follows:

If the flow velocity Vcosα is equal to 20 m/s and C is equal to 450 m/s, $$\Delta\psi_{M1} = 2\pi f_M \frac{L}{C+v} = 2\pi 1830 \frac{0.424}{450+20} = 10.372877$$
$$= 3\pi + 0.30178\pi \quad (n=3)$$

$$\Delta\psi_{M2} = 2\pi f_M \frac{L}{C-v} = 3\pi + 0.60893\pi \quad (n=3)$$

Herein, the phase differences that the discriminator can measure are 0.30178π and 0.60893π. If the measuring error of the phase differences is performed in the range of ±1%, the computed phase difference is as follows:

$$\Delta\psi_{M1}' = 3\pi + 0.30178\pi(1+0.01) = 10.382328 rad$$

$$\Delta\psi_{M2}' = 3\pi + 0.60893\pi(1-0.01) = 11.31865 rad$$

Next procedure is as follows:

$$\Delta\psi_{M1}' \cdot \frac{f_C}{\pi f_M} = 10.3823 \cdot \frac{40 \cdot 10^3}{\pi 1830} = 72.235819$$

Herein, $m_1$ (=72) is stored at the memory of the system.

$$\Delta\psi_{M2}' \cdot \frac{f_C}{\pi f_M} = 11.31865 \frac{40 \cdot 10^3}{\pi 1830} = 78.75056$$

Herein, $m_2$ (=78) is stored at the memory of the system.
The actual phase difference between the carriers is as follows:

$$\Delta\psi_{C1} = 2\pi f_C \frac{L}{C+v} = 226.7294102 = 72.17021276\pi$$

Wherein, it is noted that $m_1$(=72) is coincident with the stored value and the phase difference $\Delta\psi_{CM1}$ between the carriers that can be directly measured is equal to 0.17021276.

$$\Delta\Psi_{C2} = 2\pi f_C \frac{L}{C-v} = 247.8205182 = 78.88372094\pi$$

Wherein, $m_2$ (=78) is coincided with the stored value, and the phase difference $\Delta\psi_{CM2}$ between the carriers is equal to 0.88372094.
If the phase differences $\Delta\psi_{CM1}$ and $\Delta\psi_{CM2}$ are measured in the range of the error of ±1%, $$\Delta\psi_{CM1}' = 0.54 rad, \Delta\psi_{CM2}' = 2.748 rad$$

The calculating results of the phase difference $\Delta\psi_{C1}$ and $\Delta\psi_{C2}$ are as follows:

$$\Delta\psi_{C1}' = 72\pi + 0.54 = 226.73467 rad$$

$$\Delta\psi_{C2}' = 78\pi + 2.748 = 247.7922 rad$$

These phase differences are substituted into the flow velocity measuring expression to compute the flow velocity as follows:

$$V'\cos\alpha = \pi f_C L \left( \frac{1}{\Delta\psi_{C1}'} - \frac{1}{\Delta\psi_{C2}'} \right)$$
$$= \pi 40 \cdot 10^3 \cdot 0.424 \left( \frac{10^{-3}}{0.0226 \cdots} - \frac{10^{-3}}{0.24779 \cdots} \right)$$
$$= 19.97 \text{ m/s}$$

The first flow velocity Vcosα is equal to 20 m/s, but the actual measured flow velocity becomes 19.95 m/s. Thus, the measuring error becomes about −0.15%. That is to say, the phase differences are measured two times in the range of ±1%. As a result, the flow velocity measuring error is reduced by 0.15%.
Such like error reduced reason is why the measuring errors of the phase difference $\Delta\psi_{C1}$ and $\Delta\psi_{C2}$ are significantly decreased.

$$\delta_{\psi_{C1}} = \frac{\Delta\psi_{C1}' - \Delta\psi_{C1}}{\Delta\psi_{C1}}$$
$$= \frac{226.73467 - 226.72941}{226.72941}$$
$$= 0.00002323 = 0.0023\%$$

If the phase difference $\Delta\psi_{CM1}$ is measured at $\delta_C$ (=1%) the measuring error $\Delta\psi_{C1}$ is reduced $m_1/\beta$ (=72/0.1702≈423) times (referring to the expression 18). It is assumed that the phase differences $\Delta\psi_{MM1}$, $\Delta\psi_{MM2}$ and $\Delta\psi_{CM1}$, $\Delta\psi_{CM2}$ are measured at the error of ±1% from the above example, but it is normal that the phase difference is measured at the error of ±0.5%.

As described above, according to the invention, the flow velocity of gas, in which the flow velocity is high and the sound velocity is low, can be accurately measured based on the phase difference method irrelevant to the sound velocity change in a pipe of a larger inner diameter.

Figure 5:
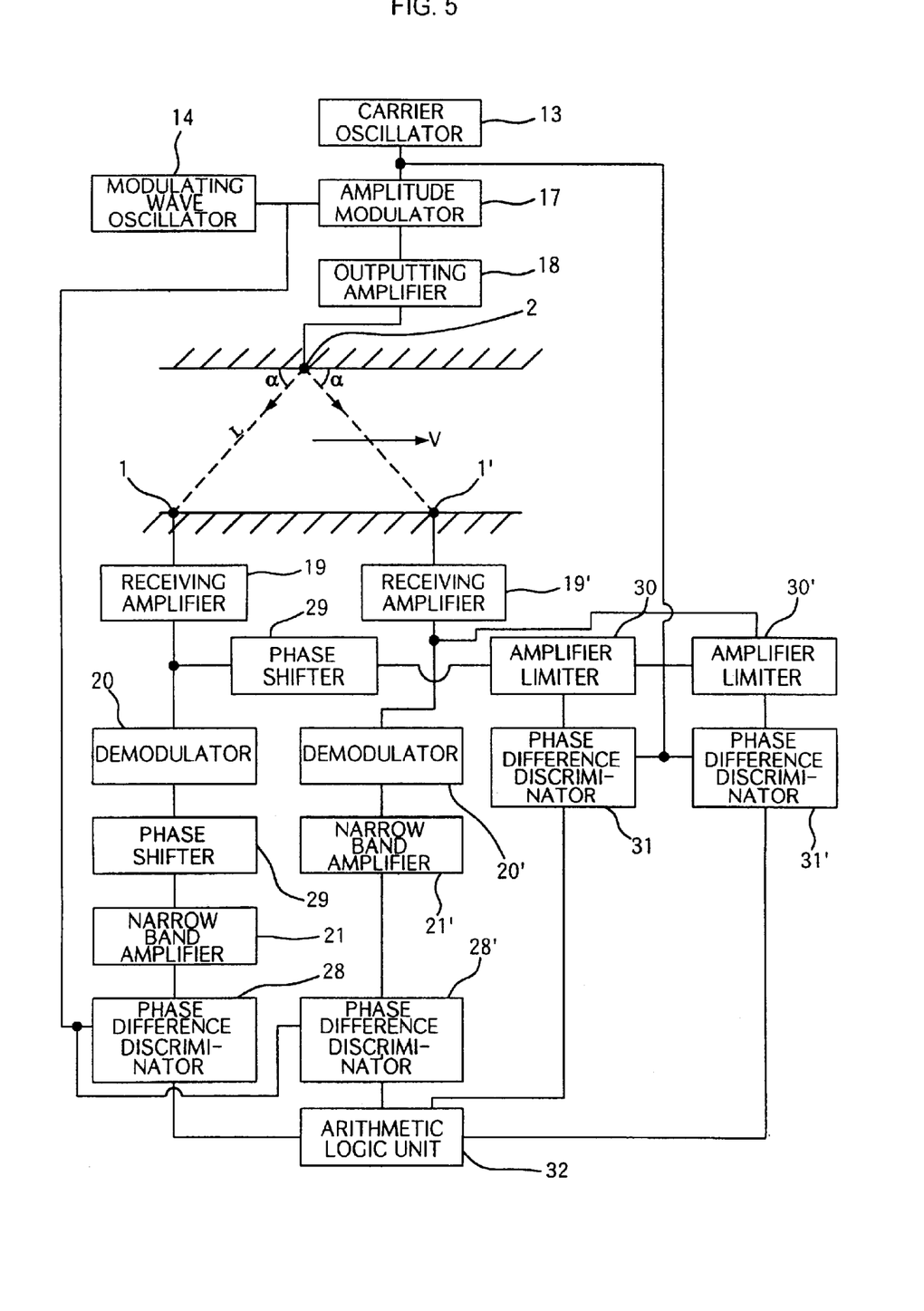
FIG. 5 is a schematic block diagram illustrating an ultrasonic phase difference flow velocity measuring system according to the invention; and, FIG. 6 is a schematic block diagram illustrating an ultrasonic phase difference flow velocity measuring system according to another embodiment of the invention.

In FIG. 5, a schematic block diagram illustrating the configuration of a system for realizing a method of measuring a flow velocity based on the phase difference method is shown as one embodiment of the invention.

Ultrasonic transducers 1 and 1' are an ultrasonic receiving transducer to receive an ultrasonic wave, and ultrasonic transducer 2 is an ultrasonic transiting transducer to transit ultrasonic waves at a wider directivity angle. A carrier oscillator 13 and a modulating wave oscillator 14 generate a signal of an ultrasonic carrier frequency $f_C$ and a signal of an amplitude-modulation frequency $f_M$, respectively. An amplitude-modulator 17 amplitude-modulates an ultrasonic carrier frequency $f_C$. An outputting amplifier 18 excites the ultrasonic transducer 2. Receiving amplifiers 19 and 19' amplifier the signals from the ultrasonic transducers 1 and 1', respectively. Demodulators 20 and 20' demodulate the amplitude-modulated signal to detect the signal of the modulation frequency $f_M$. Narrow band amplifiers 21 and 21' amplify the signals outputted from the demodulator 20 and 20'. Phase difference discriminators 28 and 28' detect the phase differences $\Delta\psi_{MM1}$ and $\Delta\psi_{MM2}$ between the signals of the amplitude-modulation frequency $f_1$. Phase difference discriminators 31 detect the phase differences $\Delta\psi_{CM1}$ and $\Delta\psi_{CM2}$ between the carriers of the carrier frequency $f_C$. Amplifier-limiters 30 and 30' amplify the amplitude-modulated signals and limit them to a predetermined level. Phase shifters 29 and 29' function to force the output of the phase difference discriminators 28 and 28' to be adjusted to zero, if the flow velocity V is zero. An arithmetic logic unit 32 computes the phase differences $\Delta\psi_{C1}$ and $\Delta\psi_{C2}$ between the carriers of the carrier frequency $f_C$ and then the flow velocity according to the invention.

The ultrasonic flow velocity measuring system is operated as follows:

The amplitude-modulator 17 amplitude-modulates the signal of the carrier frequency $f_C$ generated by the carrier oscillator 13 into the modulation frequency $f_M$ generated by the modulation oscillator 14. The amplifier 18 amplifies the amplitude-modulated signal and supplies it to the transiting ultrasonic transducer 2. If the transducer 2 transits the amplitude-modulated signal in the directions similar and contrary to the flow velocity, the receiving transducer 1 receives the signal transited in the directions similar and contrary to the flow velocity V and converts it into electrical signals. The outputting signal from the receiving transducer 1 is amplified by the receiving amplifier 19 for amplifying the frequency band of $f_C \pm f_M$ and inputted into the demodulator 20. The demodulator 20 generates the signal of the amplitude-modulation frequency $f_M$ at its output. The signal is inputted through the phase shifter 29 into the narrow band amplifier 21. The narrow band amplifier 21 again filters the amplitude-modulated signal and applies it to the phase difference discriminator 28 of a lower amplitude-modulation frequency $f_M$. The discriminator 28 detects the signal corresponding to the phase difference of $\Delta\psi_{MM2}$ that is smaller than $\pi$ and inputs its outputting signal into the arithmetic logic unit 32 thereby to compute the phase difference and the flow velocity.

The ultrasonic wave transited in the flow velocity direction is received by the receiving transducer 1', and the phase difference $\Delta\psi_{MM1}$ is detected through a receiving amplifier 19', a demodulator 20', a narrow band amplifier 21' and the discriminator 28' as mentioned above. At the same time, the outputting signal from the receiving amplifier 19' is amplified by the amplifier-limiter 30' and inputted into the phase difference discriminators 31'. The phase difference discriminator 31' generates the signals corresponding to the phase differences $\Delta\psi_{CM1}$ and $\Delta\psi_{CM2}$ and inputs them to the arithmetic logic unit 32.

The arithmetic logic unit 32 is supposed to force the integers of n, $f_M$, $f_C$, L, and $\cos\alpha$ to be inputted thereinto in advance and obtains $m_1$ and $m_2$ according to the expression (13), calculates the phase differences $\Delta\psi_{C1}$ and $\Delta\psi_{C2}$ of the carriers according to the expression (15) and computes the flow velocity V according to the expression (16). Such like obtained flow velocity may be used in computing the flow rate, if it is adapted to a flowmeter.

There is a case that the sound velocity C is measured in another way. For example, if a flowmeter for measuring a volume flow rate is installed to measure the mass flow rate of gas, the gas pressure and temperature are separately measured. In that case, the sound velocity can be computed using the measuring results of the gas pressure and temperature. If the liquid flow rate is measured, there is a case that the sound velocity C in liquid may be previously known without being changed. In that case, the ultrasonic wave transited in the directions similar and contrary to the flow velocity are received, and the phase difference $\Delta\phi_C$ between the received signals is measured, so that the flow velocity V could be measured based on the expression (5). At that time, if $\Delta\phi_C >> \pi$, the phase difference $\Delta\phi_C$ is measured as follows: in order to amplitude-modulate the signal of the ultrasonic carrier frequency $f_C$ into the amplitude-modulation frequency $f_M$, the amplitude-modulation frequency $f_M$ is selected as follows:

$$f_M \leq \frac{C_{\min}^2}{4LV_{\max}\cos\alpha} \quad (19)$$

Wherein, $C_{min}$ is a lowest sound velocity that can be expected in fluid.

The phase difference $\Delta\phi_M$ between the receiving signals of such like selected amplitude-modulated frequency does not exceeds $\pi$ in the maximum flow velocity measuring value. The amplitude-modulated signal received is demodulated, so that the phase difference $\Delta\phi_M$ between the amplitude-modulated frequency signals is measured, and then m is obtained by the following expression (20).

$$\Delta\varphi_M \times \frac{f_C}{\pi f_M} - m + a = \frac{\Delta\varphi_C}{\pi} \quad (20)$$

Wherein, a<1.0.

The $a\pi$ in the expression (19) is a part that enables the measurement of the phase difference between the carriers. At the same time, the phase difference $a\pi$ between the carriers is measured, and $\Delta\phi_C$ is calculated by the following expression.

$$\Delta\phi_C = m\pi + a\pi \quad (20)$$

Next, the $\Delta\phi_C$ is substituted into the expression (5) to compute the flow velocity V. Herein, the phase difference to be measured is $a\pi$. When measuring absolute error $\Delta a\pi$ of the $a\pi$ is equal to $\delta_{a\pi} \times a\pi$ ($\delta_{a\pi}$ is a relative error.), the measuring error of $\Delta\phi_C$ is as follows:

$$\delta_{\varphi_C} = \frac{\delta_{a\pi} a_\pi}{(m+a)\pi} = \frac{\delta_{a\pi}}{1 + m/a}$$

Therefore, $\delta_{\phi C} << \delta_{a\pi}$ and the accuracy of the flow velocity calculation is enhanced.

Figure 6:
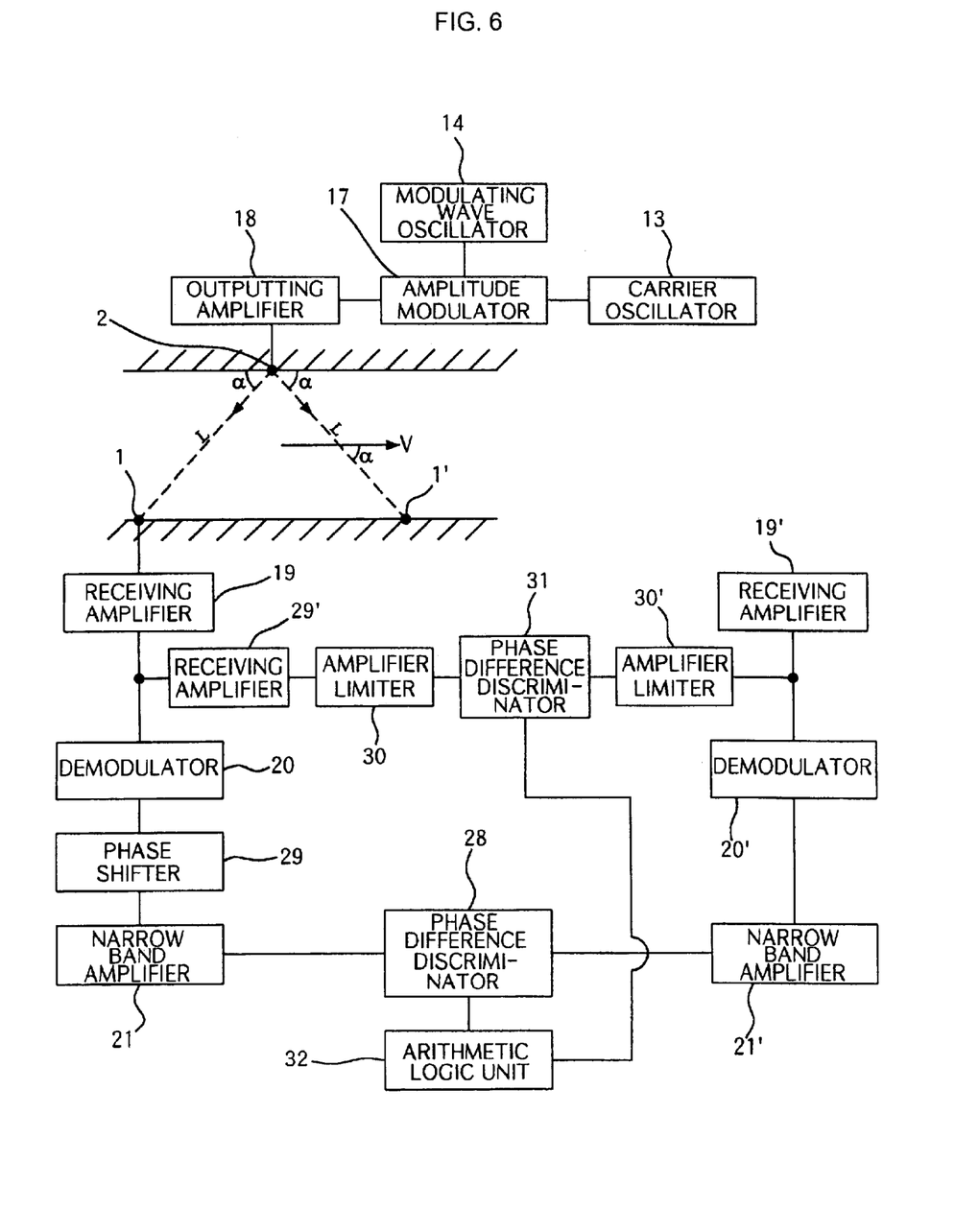

Another embodiment of a system for realizing a method for measuring a flow velocity such like this method is shown as a schematic diagram in FIG. 6.

Referring to FIG. 6, the reference numbers are referenced by the same numbers to the same parts as those of FIG. 5. Only, a flow velocity arithmetic logic unit is supposed to force the integers of $f_M$, $f_C$, L and $\cos\alpha$ to be inputted therein in advance and to compute the flow velocity based on the expressions (18), (19) and (5).

Accordingly, the invention can amplitude-modulate an ultrasonic wave and measure a flow velocity in a higher reliability based on an ultrasonic time difference method in a larger river, a larger sluiceway channel, and a pipe of a larger inner diameter. Also, the invention provides a phase difference flow velocity measuring method not depending upon a sound velocity, using a general phase difference discriminator having the phase difference measuring range of $\pi$, even if the phase difference exceeds $\pi$ radian.

What is claimed is:

1. A method for measuring a flow velocity of a fluid comprising:
   transmitting a first amplitude modulated signal from a first tranducer disposed on one side of a flow of the fluid to a second tranducer disposed on an opposite side of the flow of the fluid at an angle $\alpha$ from the first transducer relative to the
   flow, the first amplitude modulated signal including a first sine wave having an ultrasonic carrier frequency $f_c$ amplitude modulated by a second sine wave having a frequency $f_m$ that is less than $f_c$ for at least a first portion of the second sine wave;

demodulating the first amplitude modulated signal received by the second transceiver to obtain a first demodulated signal having the frequency $f_m$;

determining a first transit time for the first amplitude signal, the first transit time being equivalent to a time period between a moment that a voltage potential of the second sine wave passes a zero potential during the first portion of the second sine wave and a moment that a voltage potential of the first demodulated signal passes the zero potential during a corresponding portion of the first demodulated signal;

transiting a second amplitude modulated signal from the second transducer to the first transducer, the second amplitude modulated signal including the first sine wave modulated by the second wave for at least a second portion of the second sine wave;

demodulating the second amplitude modulated signal as received by the first transceiver to obtain a second demodulated signal having the frequency $f_m$;

determining a second transit time for the second amplitude signal, the second transit time being equivalent to a time period between a moment that a voltage potential of the second sine wave passes the zero potential during the second portion and a moment that a voltage potential of the second demodulated signal passes the zero potential during a corresponding portion of the second demodulated signal; and determining a flow velocity of the fluid based on the first and second transit times.

2. The method of claim 1, wherein:

the first portion of the second sine wave is one period of the second sine wave;

the second portion of the second sine wave is one period of the second sine wave;

the portion of the first demodulated signal is one period of the second sine wave; and the portion of the second demodulated signal is one period of the second sine wave.

3. The method of claim 1, wherein:

the first portion of the second sine wave is 1.5 periods of the second sine wave;

the second portion of the second sine wave is 1.5 periods of the second sine wave;

the portion of the first demodulated signal is 1.5 periods of the second sine wave; and the portion of the second demodulated signal is 1.5 periods of the second sine wave.

4. The method of claim 1, wherein the frequency $f_m$ of the second sine wave satisfies the following relation:

$$10\left(\frac{C_{max} + v_{max}}{L}\right) \le f_M \le 0.05\, f_c$$

where $C_{max}$ represents a maximum sound velocity of the fluid, $v_{max}$ represents a maximum flow velocity of the fluid that is expected in the distance L between the first transducer and the second transducer.

5. The method of claim 1, wherein the flow velocity is determined by the following equation:

$$V = \frac{L^2}{2L\cos(\alpha)} \frac{t_2 - t_1}{t_2 * t_1}$$

where V represents the flow velocity, L represents a distance between the first transducer and the second transducer, $\alpha$ represents the angle between the first transducer and the second transducer relative to a direction of the flow of the fluid, $t_1$ represents the first transit time and $t_2$ represents the second transit time.

6. An apparatus for a flow velocity of a fluid comprising:

a first transducer disposed on one side of a flow of the fluid and being adapted to transmit a first amplitude modulated signal and receive a second amplitude modulated signal, the first amplitude modulated signal including a first sine wave having an ultrasonic carrier frequency $f_c$ amplitude modulated by a second sine wave having a frequency $f_m$ less than $f_c$ for at least a first portion of the second sine wave and the second amplitude modulated signal including the first sine wave modulated by the second sine wave for at least a second portion of the second sine wave;

a second transducer disposed on an opposite side of the flow of the fluid at an angle $\alpha$ from the first transducer relative to the flow and being adapted to receive the first amplitude modulated signal and transmit the second amplitude modulated signal;

a demodulator in electrical communication with the first and second transducer and being adapted to:
  demodulate the first amplitude modulated signal as received by the second transducer to generate a first demodulated signal; and
  demodulate the second amplitude modulated signal as received by the first transducer to generate a second demodulated signal;

a mechanism for determining a first transit time for the first amplitude signal, the first transit time being equivalent to a time period between a moment that a voltage potential of the second sine wave passes a zero potential during the first portion of the second sine wave and a moment that a voltage potential of the first demodulated signal passes the zero potential during a corresponding portion of the first demodulated signal;

a mechanism for determining a second transit time for the second amplitude signal, the second transit time being equivalent to a time period between a moment that the voltage potential of the second sine wave passes the zero potential during the second portion of the second sine wave and a moment that a voltage potential of the second demodulated signal passes the zero potential during a corresponding portion of the second demodulated signal; and a mechanism for determining a flow velocity of the fluid based at least on the first and second transit times.

7. The apparatus of claim 6, wherein:

the first portion of the second sine wave is one period of the second sine wave;

the second portion of the second sine wave is one period of the second sine wave;

the portion of the first demodulated signal is one period of the second sine wave; and the portion of the second demodulated signal is one period of the second sine wave.

8. The apparatus of claim 6, wherein:

the first portion of the second sine wave is 1.5 periods of the second sine wave;

the second portion of the second sine wave is 1.5 periods of the second sine wave;

the portion of the first demodulated signal is 1.5 periods of the second sine wave; and the portion of the second demodulated signal is 1.5 periods of the second sine wave.

9. The apparatus of claim 6, wherein the frequency $f_m$ of the second sine wave satisfies the following relation:

$$10\left(\frac{C_{max} + v_{max}}{L}\right) \leq f_M \leq 0.05\, f_c$$

where $C_{max}$ represents a maximum sound velocity of the fluid, $v_{max}$ represents a maximum flow velocity of the fluid that is expected in the distance L between the first transducer and the second transducer.

10. The apparatus of claim 6, wherein the flow velocity is determined by the following equation:

$$V = \frac{L^2}{2L\cos(\alpha)} \frac{t_2 - t_1}{t_2 * t_1}$$

where V represents the flow velocity, L represents a distance between the first transducer and the second transducer, $\alpha$ represents the angle between the first transducer and the second transducer relative to a direction of the flow of the fluid, $t_1$ represents the first transit time and $t_2$ represents the second transit time.

* * * * *